United States Patent
Kusumoto et al.

(10) Patent No.: US 7,019,939 B2
(45) Date of Patent: Mar. 28, 2006

(54) APPARATUS AND METHOD FOR POSITIONING HEAD AT TARGET POSITION ON DISK

(75) Inventors: Tatsuharu Kusumoto, Higashiyamato (JP); Koji Yaegashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 223 days.

(21) Appl. No.: 10/743,452

(22) Filed: Dec. 23, 2003

(65) Prior Publication Data

US 2004/0136109 A1    Jul. 15, 2004

(30) Foreign Application Priority Data

Dec. 27, 2002  (JP)  ............................. 2002-380276

(51) Int. Cl.
 *G11B 5/55*  (2006.01)
(52) U.S. Cl. .................................... 360/78.14
(58) Field of Classification Search ............... None
See application file for complete search history.

(56) References Cited

U.S. PATENT DOCUMENTS

| | | | |
|---|---|---|---|
| 5,825,580 A | 10/1998 | Shibata | |
| 6,052,250 A * | 4/2000 | Golowka et al. | 360/78.14 |
| 6,256,160 B1 * | 7/2001 | Liikanen et al. | 360/78.14 |
| 6,421,197 B1 | 7/2002 | Abdelnour | |
| 6,437,947 B1 * | 8/2002 | Uno | 360/75 |
| 6,724,562 B1 * | 4/2004 | Ang et al. | 360/78.04 |
| 6,765,737 B1 * | 7/2004 | Lim et al. | 360/48 |
| 6,765,744 B1 * | 7/2004 | Gomez et al. | 360/75 |

FOREIGN PATENT DOCUMENTS

| | | |
|---|---|---|
| EP | 0 387 018 A2 | 9/1990 |
| EP | 0 457 536 A1 | 11/1991 |
| EP | 0 542 558 A2 | 5/1993 |
| JP | 10-255201 | 9/1998 |

OTHER PUBLICATIONS

Danish Search Report for Application No. SG 200307530-6, dated May 25, 2004.

* cited by examiner

*Primary Examiner*—David Hudspeth
*Assistant Examiner*—James L Habermehl
(74) *Attorney, Agent, or Firm*—Pillsbury Winthrop Shaw Pittman, LLP

(57) ABSTRACT

On the basis of the position of a first target track specified by a command from a host, a CPU calculates a first offset value reflecting a track pitch that enables the adverse effects of crosstalk to be suppressed. The first offset value indicates an offset of a target position at which a head is to be actually positioned from a predetermined position on the first target track. The CPU determines a second target track, to which the target position belongs, and a second offset value on the basis of the position of the first target track and the calculated first offset value. The second offset value indicates an offset of the target position from the predetermined position on the second target track. The CPU positions the head at the target position on the determined second target track on the basis of the determined second target track position and second offset value.

21 Claims, 10 Drawing Sheets

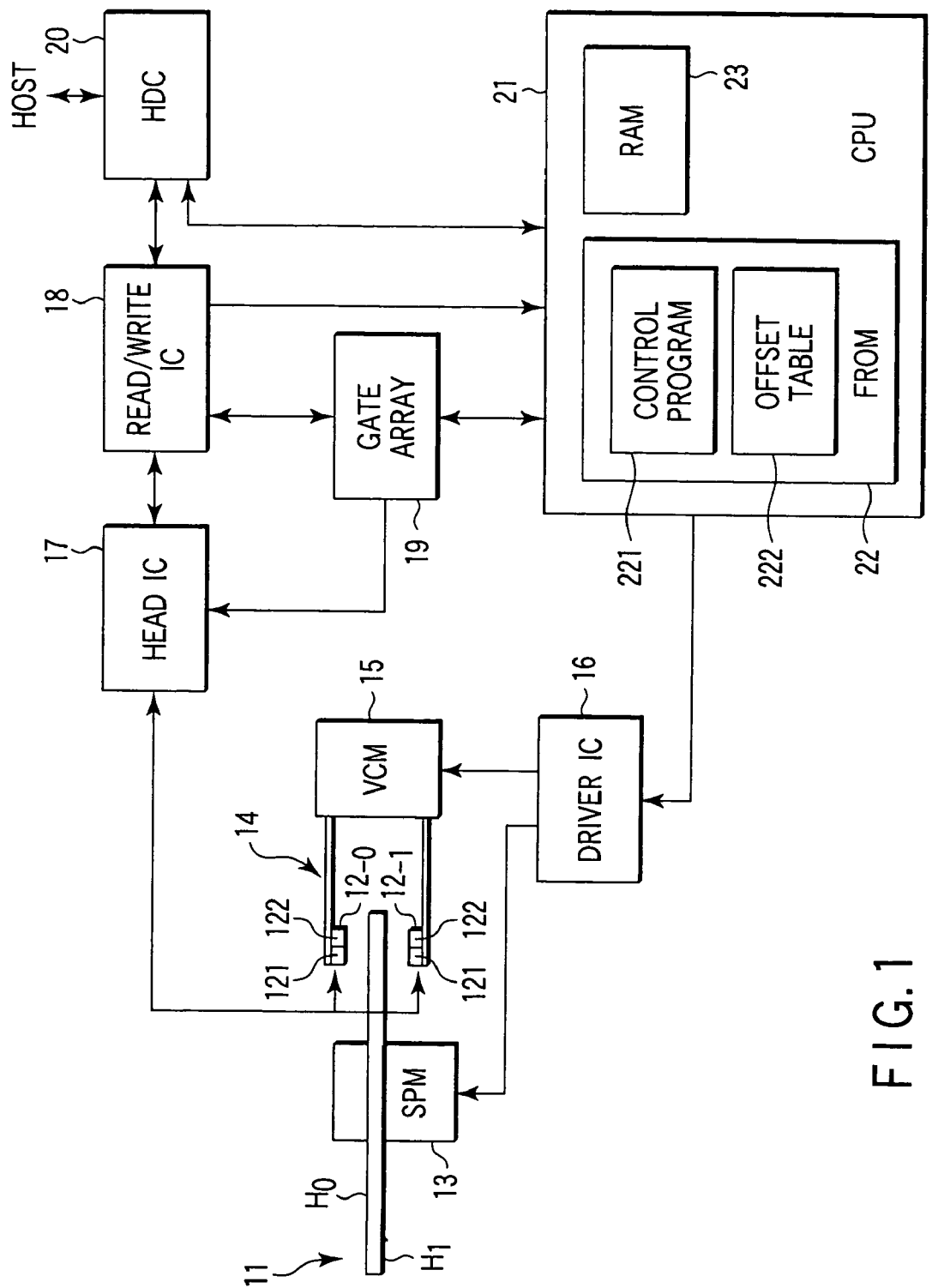
F I G. 1

| AREA (LEADING TRACK) | OFFSET |
|---|---|
| $E_1$   $A_1 (T_{10})$ | $O_1, \Delta O_1$ |
| $E_2$   $A_2 (T_{20})$ | $O_2, \Delta O_2$ |
| $E_3$   $A_3 (T_{30})$ | $O_3, \Delta O_3$ |
| $E_{n-1}$   $A_{n-1} (T_{(n-1)0})$ | $O_{n-1}, \Delta O_{n-1}$ |
| $E_n$   $A_n (T_{n0})$ | $O_n, \Delta O_n$ |

F I G. 4

APPARATUS AND METHOD FOR POSITIONING HEAD AT TARGET POSITION ON DISK

CROSS-REFERENCE TO RELATED APPLICATIONS

This application is based upon and claims the benefit of priority from the prior Japanese Patent Application No. 2002-380276, filed Dec. 27, 2002, the entire contents of which are incorporated herein by reference.

BACKGROUND OF THE INVENTION

1. Field of the Invention

The present invention relates to a disk drive that uses a head to read and write data from and to a disk, and in particular, to a disk drive that sets an offset between a track position specified by a command from a host and a target position at which the head is to be actually positioned, as well as a head positioning method used for this disk drive.

2. Description of the Related Art

A hard disk drive is well known as a disk drive that uses disks (disk media) as recording media. In general, a plurality of concentric servo tracks are arranged on a recording surface of a disk. The pitch of the servo tracks on the disk is fixed. Servo information is pre-written in each servo track discretely at equal intervals in the circumferential direction of the disk. The servo information pre-written in the disk is called embedded servo. The servo information is a kind of positional information, also called a servo pattern, and contains address code and burst signals. The address code contains a cylinder code (cylinder number). The cylinder code indicates a cylinder position on the disk at which the corresponding servo information is written. The burst signal is also called a position error signal, and it indicates information (position error) on the position of the head relative to the cylinder (servo track) in which the corresponding servo information is written. The cylinder code in the servo information is a value that varies with the consecutive servo tracks (in general, the respective servo tracks have different values).

If a host utilizing the hard disk drive provides a read/write command to the drive, the position of a target track on the disk specified by this command is calculated. Then, head positioning control is carried out on the basis of the servo information read by the head. This control allows the head to be positioned at the target position (in the radial direction of the disk). In this state, the head reads or writes data from or to the disk. In this case, the tracks in which the head writes data coincide with the servo tracks. The pitch of the tracks (track pitch) is fixed.

The heads of recent hard disk drives are mainly of a composite type. The composite head is composed of a read head (read element) and a write head (write element) separately formed on the same slider. With a hard disk drive comprising such a composite head, the signal to noise ratio of a read signal (reproduction signal) is degraded if the head has a large azimuth angle. This is because crosstalk may occur, in which data recorded in a track on the disk is deleted by writing data in adjacent tracks.

Thus, techniques have hitherto been proposed which suppress the adverse effects of crosstalk. For example, Jpn. Pat. Appln. KOKAI Publication No. 10-255201 describes a technique of dividing the recording surface on the disk into areas with a large azimuth angle and areas with a small azimuth angle. The technique (hereinafter referred to as the prior art) described in this publication arranges servo tracks in each area, the tracks having a track pitch unique to that area. Specifically, in the prior art, servo information is written using different track pitches for the areas with the large azimuth angle and for the areas with the small azimuth angle.

Thus, in the prior art, in order to suppress the adverse effects of crosstalk resulting from the large azimuth angle of the head, it is necessary to write servo information using different track pitches for the respective areas into which the recording surface has been divided on the basis of a difference in azimuth angle. However, the length (known as the head width) of the head in the radial direction of the disk varies with the head. Crosstalk may also occur if the width (write width) over which data is actually written varies owing to the variation in head width. In this case, different track pitches must be used to write servo information in the respective areas on the disk into which the recording surface is divided, also taking the variation in head width into account.

BRIEF SUMMARY OF THE INVENTION

According to an embodiment of the present invention, there is provided a disk drive comprising a disk having a recording surface on which a plurality of concentric tracks are arranged at a fixed pitch, wherein data is read from and written to the disk by a head arranged in association with the recording surface of the disk. The disk drive comprises calculating means, determining means, and executing means. The calculating means calculates a first offset value on the basis of the position of a first target track specified by a command from a host, the first offset value reflecting a track pitch which enables adverse effects of crosstalk to be suppressed. The first offset value indicates an offset of a target position at which the head is to be actually positioned from a predetermined position on the first target track in a radial direction of the disk. The determining means determines a second target track, to which the target position belongs, and a second offset value on the basis of the position of the first target track and the first offset value calculated by the calculating means. The second offset value indicates an offset of the target position from a predetermined position on the second target track in the radial direction of the disk. The executing means executes control to position the head at the target position on the second target track on the basis of the second target track position and second offset value each determined by the determining means.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a diagram showing the configuration of a hard disk drive according to an embodiment of the present invention;

FIG. 4 is a diagram showing an example of the structure of data in an offset table 222;

DETAILED DESCRIPTION OF THE INVENTION

With reference to the drawings, description will be given of an embodiment in which the present invention is applied to a hard disk drive. FIG. 1 is a block diagram showing the configuration of a hard disk drive (hereinafter referred to as an HDD) according to an embodiment of the present invention. In FIG. 1, a disk (magnetic disk medium) 11 has two disk surfaces including a top and bottom surfaces. At least one of the two disk surfaces of the disk 11, e.g. both disk surfaces constitute recording surfaces $H_0$ and $H_1$ on which data is magnetically recorded. Heads (magnetic heads) $12_{-0}$ and $12_{-1}$ are arranged in association with the recording surfaces H0 and H1, respectively. The head $12_{-i}$ (i=0, 1) is caused to float over the disk 11 by rotation of the disk 11 while the HDD is in operation. The head $12_{-i}$ is used to read data from the recording surface $H_i$ of the disk 11 (data recording) and to write data to the recording surface $H_i$ of the disk 11 (data reproduction). The head $12_{-i}$ is of a composite type in which a read head 121 and a write head 122 are separately formed on the same slider. The read head 121 is, for example, a magneto resistive head (MR head) composed of a magneto resistive (MR) element. The write head 122 is, for example, an inductive head composed of an inductive thin-film element. In the arrangement shown in FIG. 1, the HDD is assumed to comprise a single disk 11. However, the HDD may comprise a plurality of disks 11 stacked.

Figure 2A:
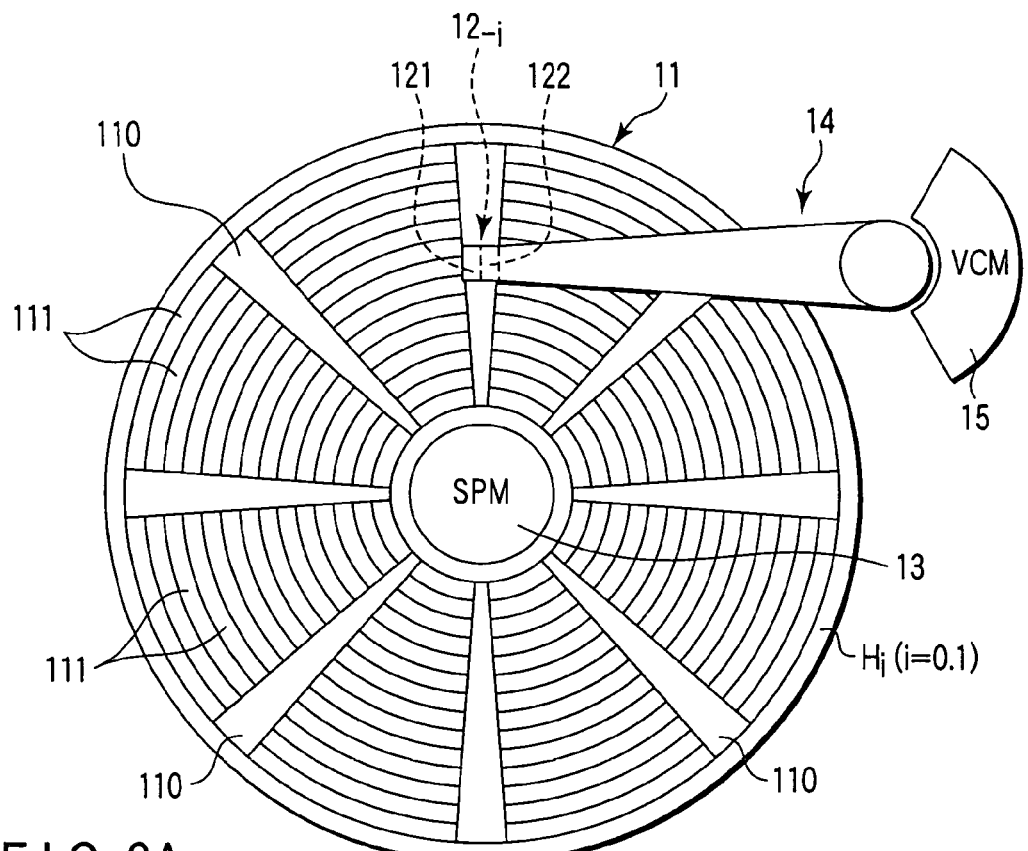
FIG. 2A is a view showing the format of a recording surface $H_i$ (i=0, 1) of a disk 11.
Figure 2B:
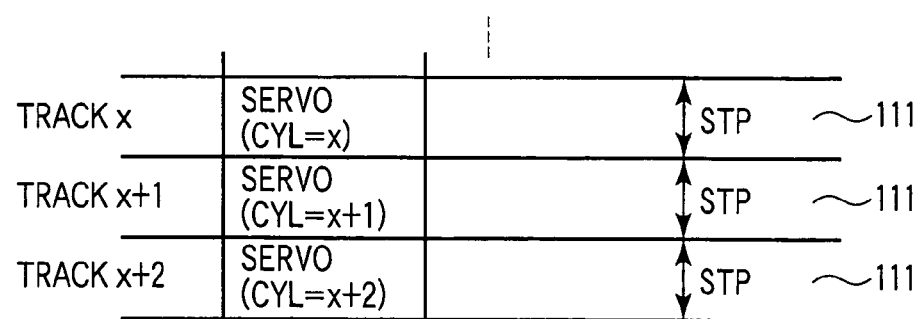
FIG. 2B is a diagram showing that cylinder codes with different values are written in consecutive servo tracks on the disk 11 at a fixed pitch.

FIG. 2A shows the format of the recording surface $H_i$ (i=0, 1) of the disk 11. As shown in this figure, a plurality of servo areas 110 are arranged on the recording surface $H_i$ of the disk 11 discretely at equal intervals in the circumferential direction of the disk 11 and radially in the radial direction of the disk 11. The area between the adjacent servo areas 110 on the recording surface $H_i$ is used for user data. A plurality of data sectors are arranged in the user data area. A plurality of concentric servo tracks 111 are arranged on the recording surface $H_i$ of the disk 11. The pitch (servo track pitch) of the servo tracks 111 is fixed. Servo information is pre-written in each servo area 110 for each servo track 111. Each servo information item contains cylinder code (cylinder number) and burst signals. The cylinder code and the burst signals are positional information required to position the head $12_{-i}$ at a target position on a target track. In this case, the cylinder code in the respective servo information items written in the servo area 110 for the respective servo tracks 111 are different values CYL (in general, different values).

Referring back to FIG. 1, the disk 11 is rotated at a high speed by a spindle motor (hereinafter referred to as an "SPM") 13. The head $12_{-i}$ is attached to the tip of an actuator (carriage) 14. The head $12_{-i}$ moves in the radial direction of the disk 11 as the actuator 14 moves rotatively. Thus, the head $12_{-i}$ is positioned on a target track. The actuator 14 includes a voice coil motor (hereinafter referred to as a VCM) 15 serving as a driving source for the actuator 14. The SPM 13 and the VCM 15 are driven by driving currents independently supplied by a driver IC 16. The driver IC 16 is a motor driver composed of one chip. A CPU 21 determines the amount of control required to determine the driving currents supplied by the driver IC 16 to the SPM 13 and the VCM 15, respectively.

The head $12_{-i}$ is connected to a head IC (head amplifier circuit) 17. The head IC 17 includes a read amplifier (not shown) that amplifies a read signal read by the head $12_{-i}$ and a write amplifier (not shown) that converts write data into a write current. A head IC 23 is connected to a read/write IC (read/write channel) 18. The read/write IC 18 is a signal processing device that executes various signal processes. These signal processes include a process of subjecting a read signal to an analog-to-digital (A/D) conversion, a process of encoding write data, and a process of decoding digitalized read data. The read/write IC 18 also has a function of pulsing (binarizing) a read signal into a read pulse signal and a function of extracting burst signals (in this case, burst signals A, B, C, and D) from servo information in accordance with a timing signal (burst timing signal) from a gate array 19. The burst signals are transmitted to the CPU 21, which uses them for positioning control (track following control) to settle the head $12_{-i}$ at a target position on a target track.

The gate array 19 has a function of generating various timing signals including a burst timing signal, from a read pulse signal outputted by the read/write IC 18 and a function of extracting cylinder code from servo information. The cylinder code is used for seek control to move the head $12_{-i}$ to the target track. A disk controller (hereinafter referred to as an "HDC") 20 is connected to a host (host system) utilizing the HDD. The host is digital electronic equipment represented by a personal computer. The HDC 20 processes read data decoded by the read/write IC 21 in accordance with a control signal from the gate array 19 to generate data to be transmitted to the host. The HDC 20 also transfers write data transferred by the host, to the read/write IC 18 in accordance with a control signal from the gate array 19.

The CPU 21 is a main controller for the HDD. The CPU 21 contains an FROM (Flash Read Only Memory) 22 and a RAM (Random Access Memory) 23. The FROM 22 is a rewritable nonvolatile memory. The FROM 22 pre-stores a control program 221 to be executed by the CPU 17. The control program 221 contains a process routine for determining a target position at which the head $12_{-i}$ is to be actually positioned, on the basis of positional information on a target track specified by a command from the host. The target position is determined taking the azimuth angle of the head $12_{-i}$ or the like into account. The FROM 22 also pre-stores an offset table 222, described later. A part of the entire area of the RAM 23 is used by the CPU 21 as a work area.

The offset table 222 indicates the relationship between concentric areas $A_j$ (j=1 to n) (see FIGS. 3A and 3B) on the recording surfaces $H_0$ and $H_1$ of the disk 11 and both offset values $O_j$ and $\Delta O_j$. The recording surfaces $H_0$ and $H_1$ are divided into the areas $A_j$ on the basis of the azimuth angle of each position of the head $12_{-i}$ in the radial direction of the disk. A plurality of servo tracks 111 are arranged in each area $A_j$. Here, the offset value (fourth offset value) $O_j$ will be described. First, it is assumed that a leading track $T_{j0}$ in the area $A_j$ is a target track $TT_1$. The target track $TT_1$ (hereinafter referred to as a first target track $TT_1$) is specified by a read/write command from the host. In the present embodiment, a target position (the position in the radial direction of the disk 11) TP at which the head $12_{-i}$ is to be actually positioned does not always coincide with a predetermined position on the target track $TT_1$. If a track $T_{j0}$ is assumed to be the track $TT_1$, the offset value $O_j$ indicates the offset (for example, in the radially inward direction of the disk 11) of the target position TP from the predetermined position on the target track $TT_1$ (=track $T_{j0}$). A track on the disk 11 to which a target position (TP) belongs is called a second target track $TT_2$. The predetermined position varies between a data read and a data write because the head $12_{-i}$ is of the composite type. However, for simplification of description, the predetermined position is assumed to be on a center line in the target track $TT_1$.

The offset value (third offset value) $\Delta O_j$ indicates the difference (pitch difference) between a servo track pitch STP and a data track pitch DTP. The data track pitch DTP enables the adverse effects of crosstalk to be suppressed. The DTP and the STP have the relationship expressed by the following equation:

$$DTP = STP + \Delta O_j \quad (1)$$

In the prior art, the data track pitch DTP is equal to the servo track pitch STP. That is, $\Delta O_j = 0$. In this case, the target position TP coincides with the predetermined position on the target track $TT_1$. However, when the data track pitch DTP is equal to the servo track pitch STP, with some HDDs, the adverse effects of crosstalk become more significant. Such HDDs are classified into two types. A first type includes HDDs in which the head $12_{-i}$ has an azimuth angle varying markedly depending on the position on the disk in its radial direction. With the first type of HDD, owing to the varying azimuth angle of the head $12_{-i}$, the width (write width) over which data is actually written by the head $12_{-i}$ also varies depending on the position on the disk in its radial direction. This is equivalent to the head width of the head $12_{-i}$ varying depending on the position on the disk in its radial direction. A second type includes HDDs in which the heads $12_{-0}$ and $12_{-1}$, corresponding to the recording surfaces $H_0$ and $H_1$, respectively, of the disk 11, have greatly different head widths (which depend on the physical shapes of the heads). Thus, in the present embodiment, for each area $A_j$, a unique data track pitch DTP (DTP>STP) is set which enables the adverse effects of crosstalk to be suppressed. Specifically, a unique offset value $\Delta O_j$ is set for each area $A_j$.

The numbers of servo tracks 111 arranged in areas $A_1$ to $A_{j-1}$ are assumed to be $N_1$ to $N_{j-1}$, respectively. The offset value $O_j$ can be calculated in accordance with the following equation:

$$O_j = O_{j-1} + \Delta O_{j-1}(N_{j-1} - \frac{1}{2}) + \Delta O_j/2 \quad (2)$$

Specifically, the offset value $O_j$ can be calculated from $O_{j-1}$, $\Delta O_{j-1}$ and $\Delta O_j$, as well as the number of tracks $N_1$ to $N_{j-1}$. In this case, $O_1 = \Delta O_1/2$.

Alternatively, the offset value $O_j$ can be calculated using the following equation:

$$\begin{aligned} O_j &= O_{j-1} + \Delta O_{j-1}(N_{j-1} - 1/2) + \Delta O_j/2 \\ &= \Delta O_1 * N_1 + \Delta O_2 * N_2 + \cdots + \Delta O_{j-1} * N_{j-1} + \Delta O_j \\ &= \Sigma \Delta O_p * N_p + \Delta O_j \end{aligned} \quad (3)$$

Here, $\Sigma \Delta O_p * N_p$ represents the sum of $\Delta O_p * N_p$ for p=1 to j-1. As is apparent from Equation (3), the offset value $O_j$ can also be calculated from the offset values $\Delta O_1$ to $\Delta O_j$ and the number of tracks $N_1$ to $N_{j-1}$. Accordingly, if the time required to calculate the offset value $O_j$ does not matter, information on the offset value $O_j$ need not necessarily be stored in an entry $E_j$ in the offset table 222.

It is assumed that the k+1-th track $T_{jk}$ in the area $A_j$ is the first target track $TT_1$. In this case, the offset of the target position TP at which the head $12_{-i}$ is to be actually positioned, from the predetermined position on the target track $TT_1$ (=track $T_{jk}$) is expressed by $O_j + k(STP + \Delta O_j) = O_j + k*DTP$.

Figure 3A:
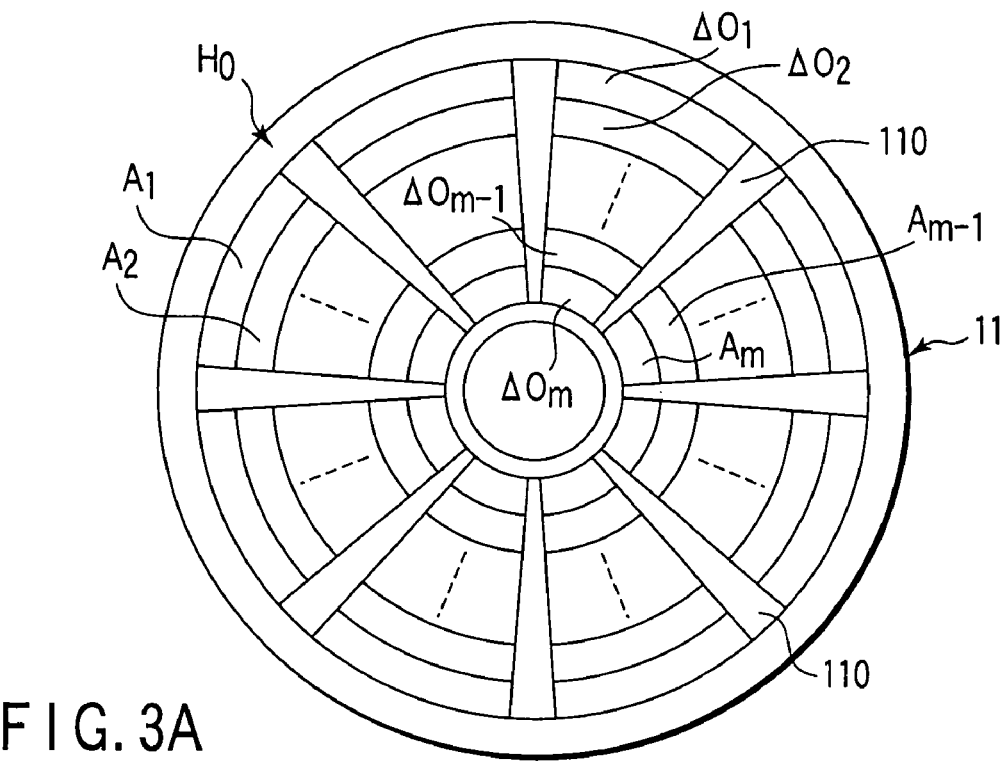
FIGS. 3A and 3B are views showing the relationship between a set of areas $A_1$ to $A_n$ on recording surfaces $H_0$ and $H_1$ of the disk 11 and a set of offset values $\Delta O_1$ to $\Delta O_n$ for the respective areas $A_1$ to $A_n$.
Figure 3B:
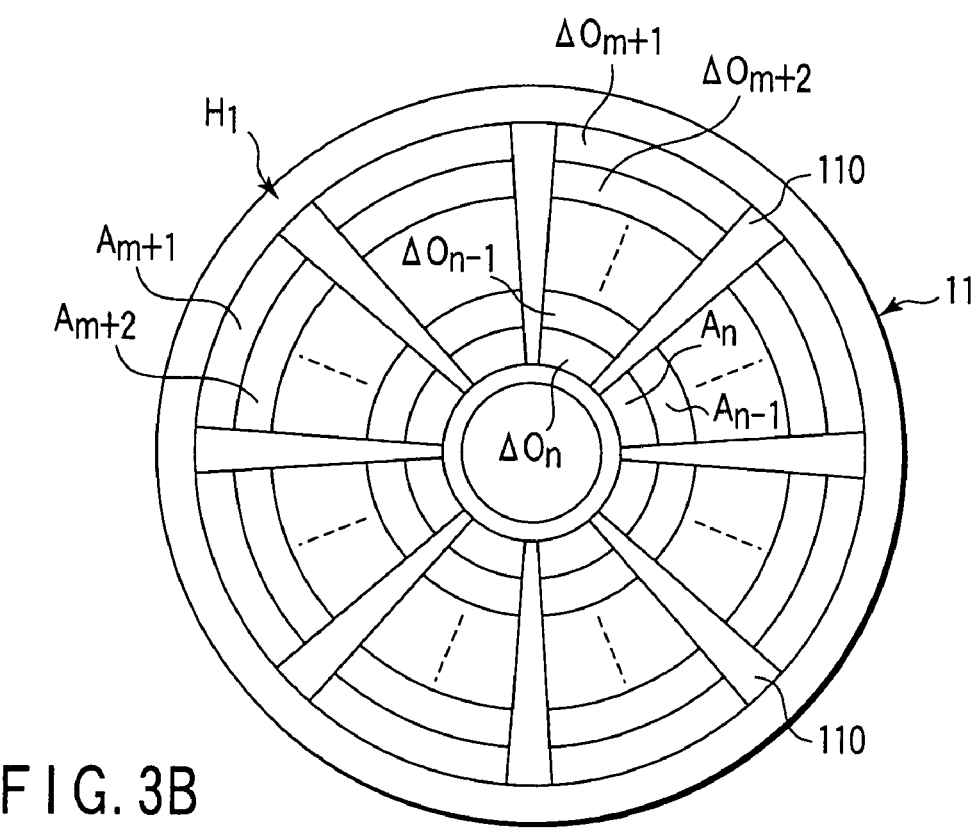

FIGS. 3A and 3B show the relationship between a set of the areas $A_1$ to $A_n$ on the recording surfaces $H_0$ and $H_1$ of the disk 11 and a set of the offset values $\Delta O_1$ to $\Delta O_n$ for the respective areas $A_1$ to $A_n$. The offset values $\Delta O_1$ to $\Delta O_n$ are determined taking into account a difference in head width between the head $12_{-0}$ and the head $12_{-1}$ corresponding to the recording surfaces $H_0$ and $H_1$, respectively.

FIG. 4 shows an example of the structure of data in the offset table 222. As shown in this figure, each entry $E_j$ (j=1 to n) in the offset table 222 stores track position information indicative of a leading track $T_{j0}$ of the servo tracks 111 contained in the area $A_j$, as well as the offset values $O_j$ and $\Delta O_j$. Here, it is assumed that the first target track $TT_1$ is the track $T_{jk}$, $T_{j0} < TT_1 < T_{(j+1)0}$, and the track $TT_1$ is contained in the area $A_j$. In this case, with reference to the entry $E_j$ in the offset table 222, it is possible to obtain the offset values $O_j$ and $\Delta O_j$ required to determine the offset of the target position TP at which the head $12_{-i}$ is to be actually positioned, from the (predetermined position on the) first target track $TT_1$.

Figure 5:
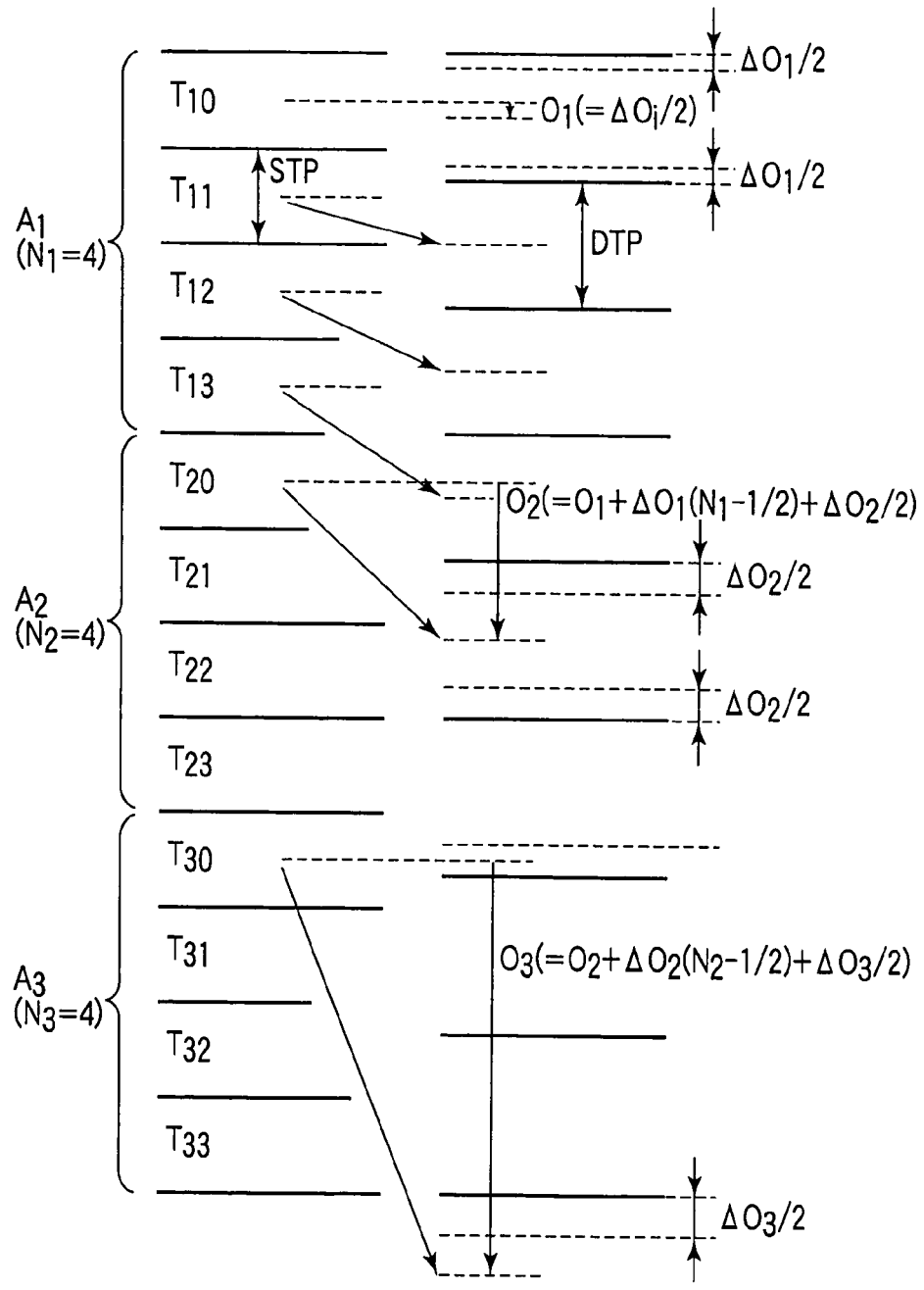
FIG. 5 is a diagram showing an example of the positional relationship between a first target track $TT_1$ and a second target track $TT_2$ if the first target track $TT_1$ is each of the consecutive servo tracks $T_{jk}$ on the disk 11.

FIG. 5 shows an example of the positional relationship between the first target track $TT_1$ (=$T_{jk}$) and a second target track $TT_2$ if the first target track $TT_1$ is each of the consecutive servo tracks $T_{jk}$ on the disk 11. In the example in FIG. 5, for the convenience of drawing, it is assumed that four tracks are contained in each of the areas $A_1$, $A_2$, and $A_3$.

The CPU 21 in FIG. 1 controls each section of the HDD in accordance with the control program 221 stored in the FROM 22. For example, CPU 21 executes seek control to move the head $12_{-i}$ to the second target track $TT_2$ on the disk 11. The second target track $TT_2$ is determined on the basis of the first target track $TT_1$ and the offset values $O_j$ and $\Delta O_j$. Specifically, the second target track $TT_2$ is obtained by correcting the first target track $TT_1$ on the basis of the offset values $O_j$ and $\Delta O_j$; the head $12_{-i}$ is to be actually moved to the second target track $TT_2$. The CPU 21 also executes positioning control to the position the head $12_{-i}$ moved to the second target track $TT_2$, at the target position TP on the target track $TT_2$. The value $\Delta O_j$' for the offset of the target position TP from the predetermined position on the second target track $TT_2$ is determined on the basis of the first target track $TT_1$ and the offset values $O_j$ and $\Delta O_j$. The CPU 21 also uses the HDC 20 to execute read/write control in accordance with a read/write command from the host.

Figure 6:
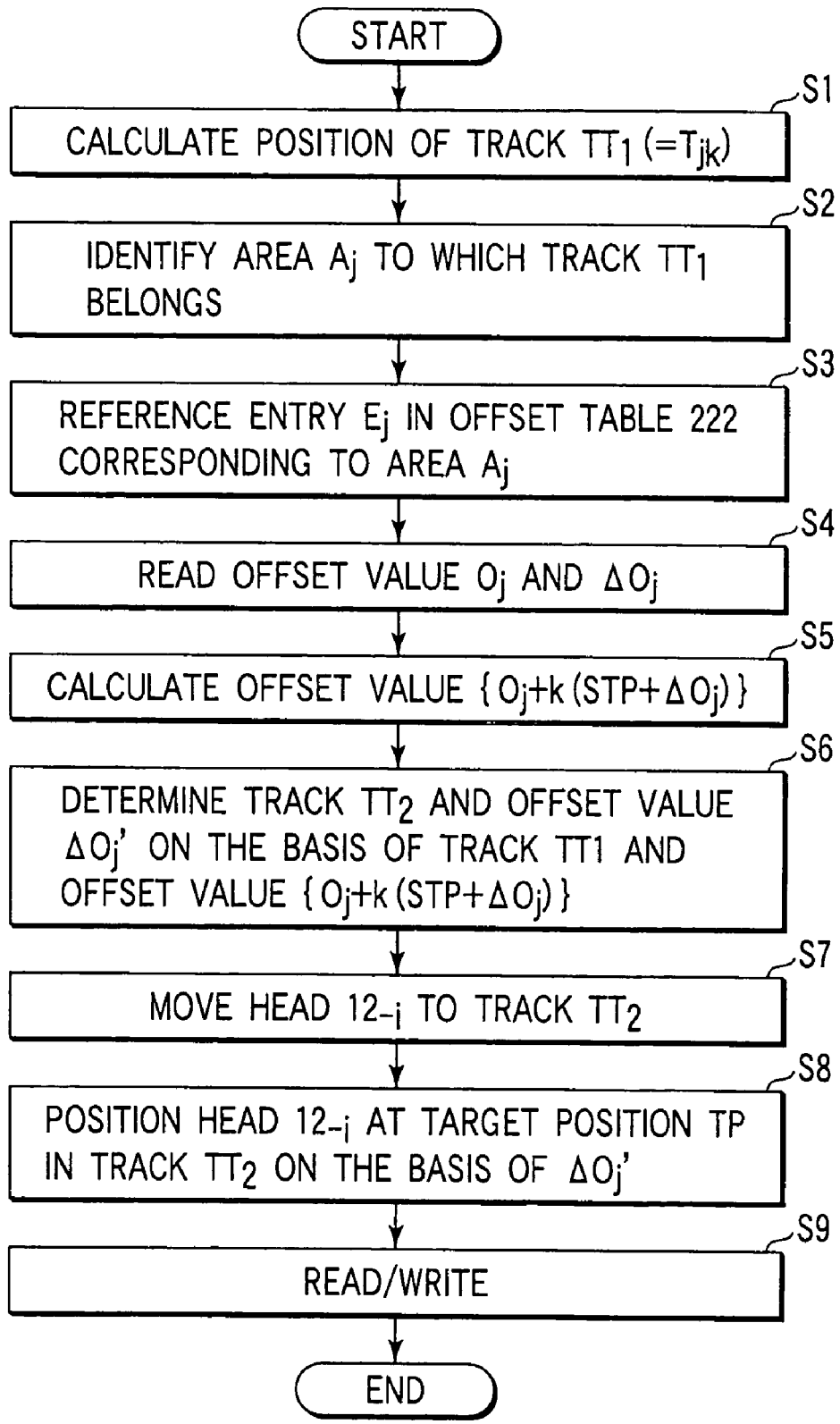
FIG. 6 is a flow chart showing an operational procedure used when a command is executed.

Now, with reference to the flow chart in FIG. 6, description will be given of execution of a read/write command in the HDD shown in FIG. 1, taking by way of example the case in which a write command from the host is executed. It is assumed that the host provides a write command to the HDD shown in FIG. 1. The write command is received by the HDC 20, which then passes the command to the CPU 21. If a read command or a write command has been delivered by the HDC 20, the CPU 21 calculates the position of the first target track TT1 specified by this command. (step S1). Normally, a read/write command from the host specifies a disk address using a logic address (logic block address). Thus, to access the disk 11, it is necessary in step S1 to execute a calculation process to convert the logic address into a physical address representative of the first target track $TT_1$. Here, it is assumed that the first target track $TT_1$ is the track $T_{jk}$.

Once the CPU 21 identifies the position of the first target track $TT_1$ (step S2), it identifies the area $A_j$ on the disk 11 to which the target track $TT_1$ ($=T_{jk}$) belongs (step S2). The area $A_j$ is one of the areas $A_1$ to $A_n$ (see FIGS. 3A and 3B) into which the recording surface $H_0$ and $H_1$ are divided. Then, the CPU 21 references the entry $E_j$ in the offset table 222 which corresponds to the area $A_j$ identified in step S2 (step S3). Then, the CPU 21 reads the offset values $O_j$ and $\Delta O_j$ stored in the referenced entry $E_j$ (step S4). On the basis of the first target track $TT_1$ ($=T_{jk}$) and the offset values $O_j$ and $\Delta O_j$ read in step S4, the CPU 21 calculates the value of the offset (first offset value) $\{O_j+k(STP+\Delta O_j)\}$ of the target position on the second target track $TT_2$ from a predetermined position on the first target track TT1 (Step S5). This offset value $\{O_j+k(STP+\Delta O_j)\}$ reflects a data track pitch that enables the adverse effects of crosstalk to be suppressed.

Then, on the basis of the target track $TT_1$ ($=T_{jk}$) and the offset value $\{O_j+k(STP+\Delta O_j)\}$, CPU 21 determines the position of the second target track $TT_2$ and the offset value (second offset value) $\Delta O_j'$ (step S6). As described previously, the offset value $O_j$ can also be calculated in accordance with Equation (3) on the basis of the offset value $\Delta O_1$ to $\Delta O_j$. Therefore, the position of the second target track $TT_2$ and the offset value $\Delta O_j'$ can be determined from the first target track $TT_1$ ($T_{jk}$) and the offset values $\Delta O_1$ to $\Delta O_j$.

Figure 7:
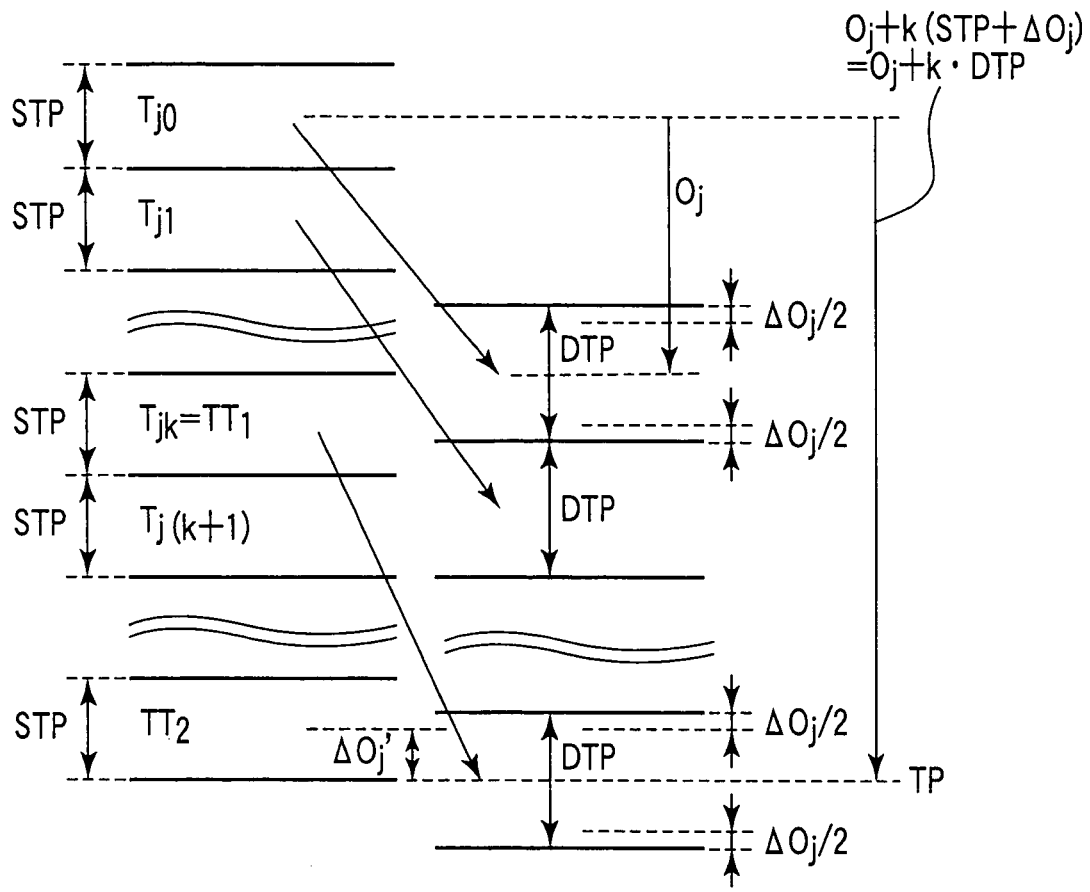
FIG. 7 is a diagram showing an example of the relationship between both the first target track $TT_1$ ($=T_{jk}$) and offsets $O_j$ and $\Delta O_j$ and both the second target track $TT_2$ and an offset $\Delta O_j'$.

As described previously, the head $12_{-i}$ is to be actually moved to the second target track $TT_2$. Specifically, the target position TP (at which the head $12_{-j}$ is positioned) that is offset from the predetermined position on the leading track $T_{j0}$ in the area $A_j$ by the offset value $\{O_j+k(STP+\Delta O_j)\}$ belongs to the second target track $TT_2$ (servo track 111). On the other hand, the offset value $\Delta O_j'$ indicates the offset of the target position TP on the second target track $TT_2$ from predetermined position on the target track $TT_2$. FIG. 7 shows an example of the relationship between both the first track $TT_1$ ($=T_{jk}$) and offsets $O_j$ and $\Delta O_j$ and both the second target track $TT_2$ and an offset $\Delta O_j'$.

Then, the CPU 21 executes seek control to move the head $12_{-i}$ to the target track $TT_2$ determined in step S6 (step S7). This seek control is executed on the basis of a cylinder code extracted from the gate array 19. When the head $12_{-j}$ is moved to the second target track $TT_2$, the CPU 21 executes positioning control. (tracking control) to position (settle) the head $12_{-i}$ at the target position TP on the target track $TT_2$ (step S8). This positioning control is based on burst signals extracted by the read/write IC 18. The target position TP at which the head $12_{-i}$ is to be positioned in this positioning control is offset from the predetermined position on the second target track $TT_2$ in the radial direction of the disk 11 by the offset value $\Delta O_j'$. When the head $12_{-i}$ is positioned within a predetermined error range from the target position TP (in this case, the target position for a write) on the second target track $TT_2$, the CPU 21 proceeds to step S9. In step S9, the CPU 21 causes the head $12_{-i}$ to execute a read/write (in this case, a write).

Thus, in the present embodiment, the target position TP at which the head $12_{-i}$ is to be positioned is determined to be a position on the target track $TT_2$ instead of the predetermined position on the first target track TT1 specified by a command from the host. The position on the second target track $TT_2$ is offset from the predetermined position on the first target track $TT_1$ in the radial direction of the disk 11 by the offset value (first offset value) $\{O_j+k(STP+\Delta O_j)\}$. This offset value reflects a track pitch that enables the adverse effects of crosstalk to be suppressed. Accordingly, by positioning the head $12_{-i}$ at the determined target position TP and executing a read/write, it is possible to achieve a data track pitch DTP that enables the use of the disk 11 in which the servo tracks 111 are arranged at a fixed pitch (servo track pitch) STP, with the adverse effects of crosstalk suppressed.

In the above embodiment, the areas $A_1$ to $A_n$ on the recording surfaces $H_0$ and $H_1$ of the disk 11 and the offset values $O_1$ to $O_n$ and $\Delta O_1$ to $\Delta O_n$ for the respective areas $A_1$ to $A_n$ are determined taking into account a difference in the azimuth angle of the heads $12_{-0}$ and $12_{-1}$ at each position on the disk in the radial direction, as well as a difference in head width between the heads $12_{-0}$ and $12_{-1}$. However, only one of these two differences may be taken into account. For example, if only the difference in azimuth angle is taken into account, each of the recording surfaces $H_0$ and $H_1$ of the disk 11 may be similarly divided into a plurality of concentric areas. In this case, the adverse effects of the difference in head width between the heads $12_{-0}$ and $12_{-1}$ may remain. These adverse effects are eliminated by determining the offset values $O_1$ to $O_n$ and $\Delta O_1$ to $\Delta O_n$ on the basis of the upper limit value in the appropriate standard for the head widths of the heads $12_{-0}$ and $12_{-1}$.

If only the difference in head width between the heads $12_{-0}$ and $12_{-1}$ is taken into account, the entire recording surfaces $H_0$ and $H_1$ of the disk 11 may correspond to the areas $A_0$ and $A_1$, respectively. Here, the offset values $O_i$ and $\Delta O_i$ (or $\Delta O_i$) may be set for each recording surface $H_i$ (i=0, 1). The offset values $O_i$ and $\Delta O_i$ can be determined (calculated) from the head width of the head $12_{-i}$ by measuring the head width during the manufacture of the HDD (or the head $12_{-i}$). The offset values $O_i$ and $\Delta O_i$ (or $\Delta O_i$) determined may be stored in the FROM 22, for example, in a format similar to that for the offset table 222, shown in FIG. 4. Here, information indicative of the recording surface $H_i$ (head $12_{-i}$) can be used in place of information (track position information indicative of the leading track) on the area $A_i$ paired with the offset values $O_i$ and $\Delta O_i$ (or $\Delta O_i$). In this example, the number of entries in the offset table 222 can be sharply reduced. However, the adverse effects of the difference in the azimuth angle at each position on the disk in its radial direction between the heads $12_{-i}$ may remain. These adverse effects are eliminated by determining the offset values $O_1$ to $O_n$ and $\Delta O_1$ to $\Delta O_n$ on the basis of the upper limit value in the appropriate standard for the head widths of the heads $12_{-0}$ and $12_{-1}$.

Figure 8A:
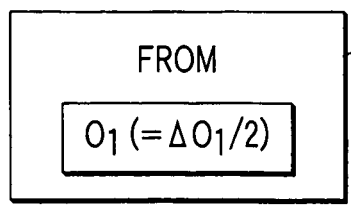
FIGS. 8A and 8B are diagrams showing that unique offset values are stored in FROMs 22 provided in respective HDDs having different data track pitches (track density)
Figure 8B:
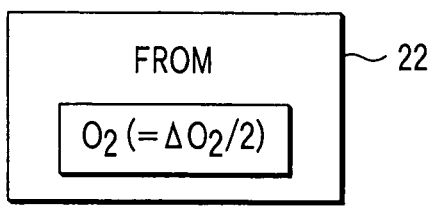
Figure 9A:
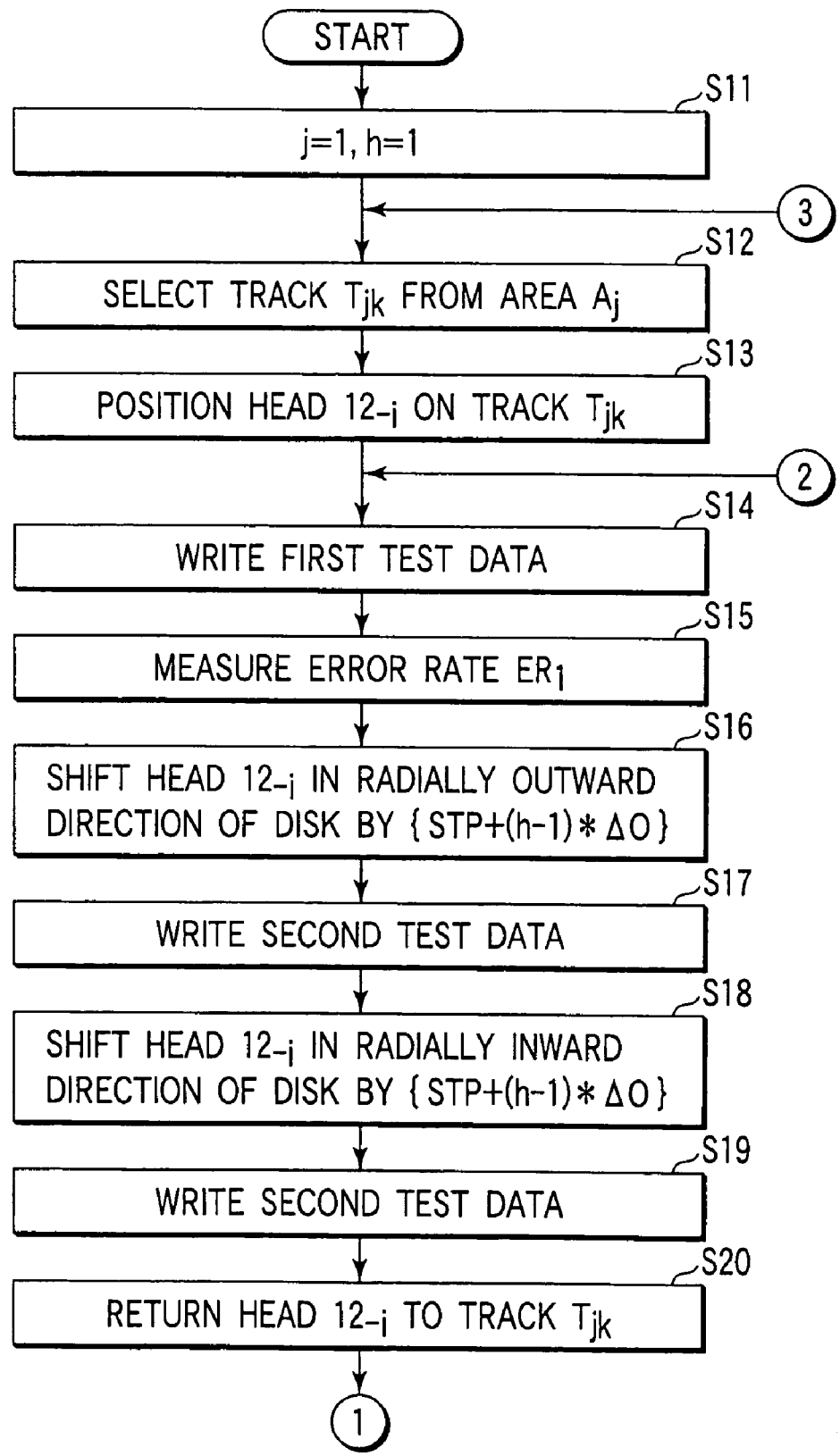
FIGS. 9A and 9B are flow charts showing the procedure of a process for determining the offsets $O_j$ and $\Delta O_j$ for each area $A_j$.
Figure 9B:
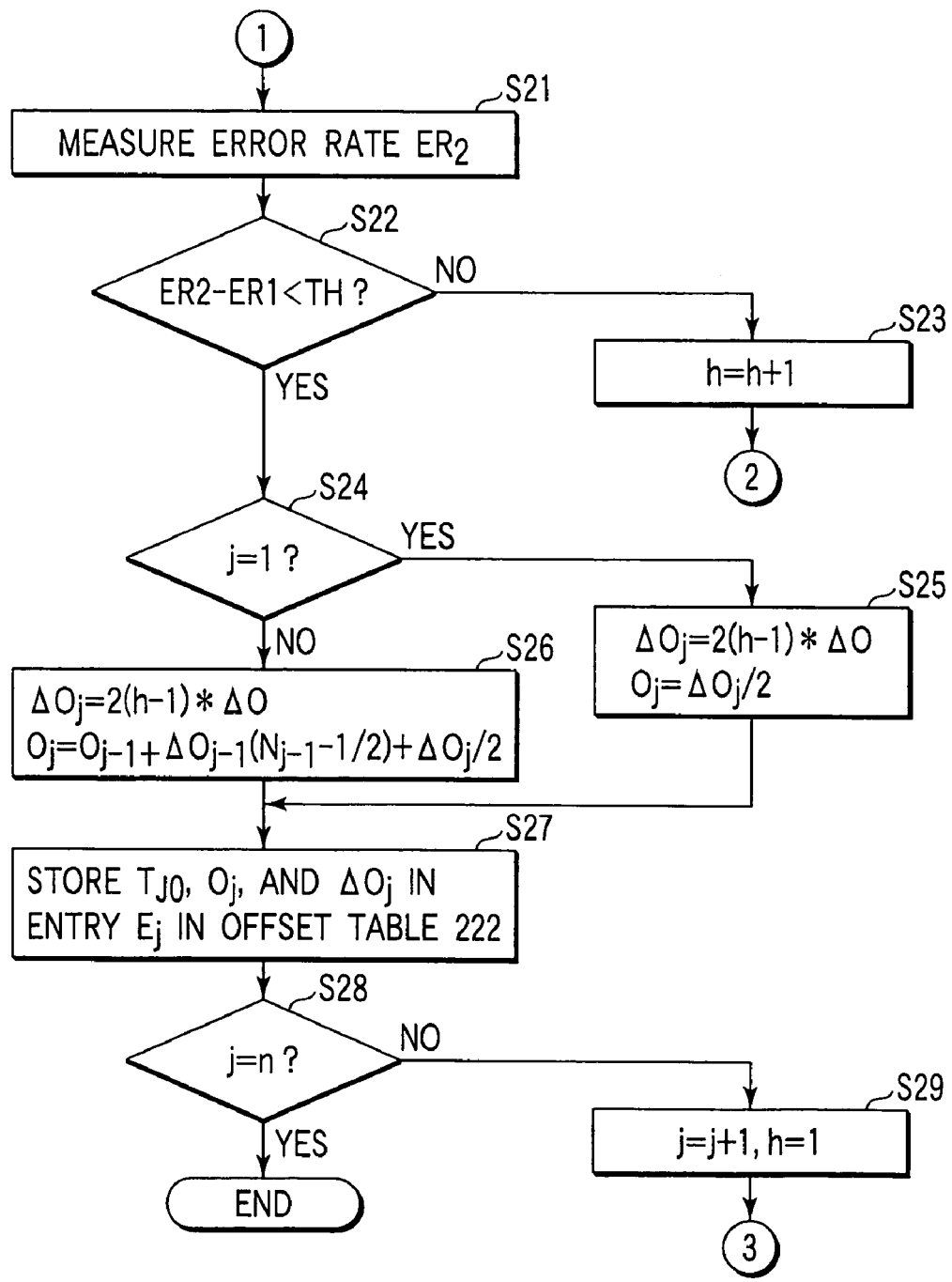

Furthermore, if only the difference in head width is taken into account, the heads are classified into, for example, first heads having a head width meeting a first standard and second heads having a head width which is outside the first standard but which meets a second standard. This classification serves to provide HDDs such as those described below. First, the upper limit value of the head width in the first standard is defined as $HW_{UL1}$. The upper limit value of the head width in the second standard is defined as $HW_{UL2}$ ($HW_{UL2} > HW_{UL1}$). Then, the heads are classified into the first heads having a head width meeting the first standard, the second heads having a head width which is outside the first standard but which meets the second standard, and third heads having a head width that is also outside the second standard. The third heads are treated as defectives that cannot be mounted in HDDs. On the other hand, the first heads are mounted in a first HDD that realizes a first data track pitch DTP (first track density). The second heads are mounted in a second HDD that realizes a second data track pitch DTP (second track density) larger than the first data track pitch DTP (first track density). The offset value $O_1$ ($=\Delta O_1/2$) determined from the head width $HW_{UL1}$ is stored in a predetermined position in the FROM 22 in the first HDD, as shown in FIG. 8A. The offset value $O_1$ is stored in the FROM 22 in the first HDD while this HDD is being manufactured. On the other hand, the offset value $O_2$ ($=\Delta O_2/2$) determined from the head width $HW_{UL2}$ is stored in a predetermined position in the FROM 22 in the second HDD, as shown in FIG. 8B. The offset value $O_2$ is stored in the FROM 22 in the second HDD while this HDD is being manufactured. The relationship between the offset values $O_1$ and $O_2$ is $O_1 < O_2$. Consequently, the use of the second head enables the second HDD to be manufactured in spite of a decrease in track density compared to the first HDD manufactured using the first head. That is, it is possible to effectively utilize the second head, having a head width which is outside the first standard but which meets the second standard.

Now, a process of determining the offset values $O_j$ and $\Delta O_j$ for each area $A_j$ will be described with reference to the flow charts in FIGS. 9A and 9B and FIGS. 10A, 10B, and 10C showing the head position. Here, for simplification of description, it is assumed that the entire recording surfaces $H_0$ and $H_1$ of the disk 11 are divided into a number n of areas $A_j$, i.e. $A_1$ to $A_n$, for management. First, the CPU 21 sets a pointer j specifying the area $A_j$, at an initial value of 1 and sets a variable h for determining the offset value, at an initial value of 1 (step S11). Then, the CPU 21 selects the track (servo track) $T_{jk}$ from the area $A_j$ on the disk 11 (step S12). Here, it is assumed that the track $T_{jk}$ is one of the servo tracks 111 in the area $A_j$ which lies at an intermediate position in the radial direction of the disk. However, the track $T_{jk}$ may be located at another position in the area $A_j$.

Figure 10C:
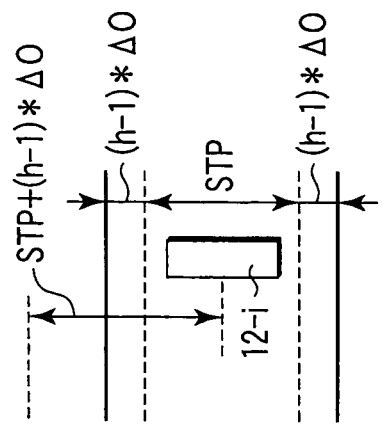
FIG. 10C is a diagram showing that the head $12_{-i}$ is offset from the predetermined position on the track $T_{jk}$ in a radially inward direction of the disk.
Figure 10B:
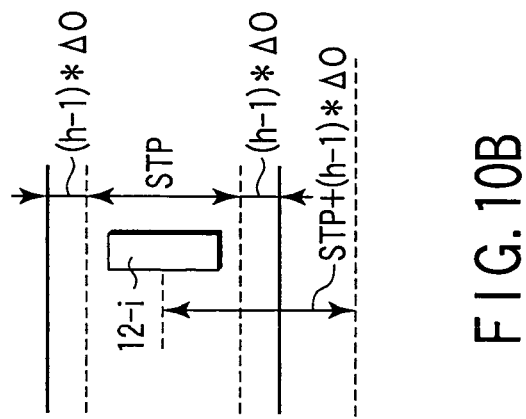
FIG. 10B is a diagram showing that the head $12_{-i}$ is offset from the predetermined position on the track $T_{jk}$ in a radially outside direction of the disk.
Figure 10A:
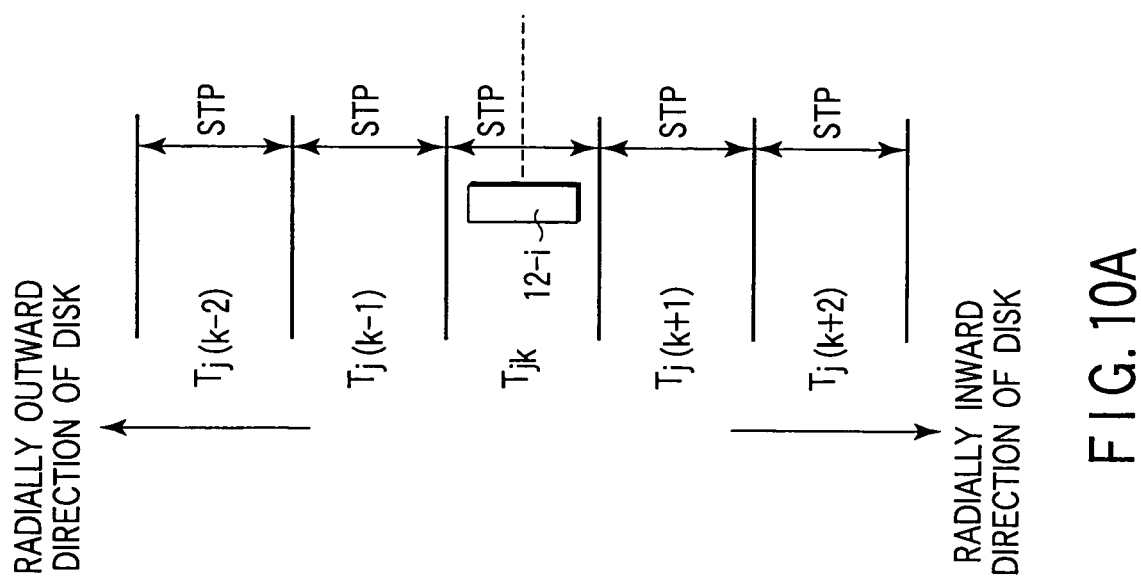
FIG. 10A is a diagram showing that a head $12_{-i}$ is positioned at a predetermined position on the track $T_{jk}$.

Then, the CPU 21 executes control to position the head 12$_{-i}$ corresponding to the recording surface $H_i$ on which the area $A_j$ exists, at a predetermined position on the track $T_{jk}$ (step S13). In step S13, the CPU 21 executes seek control to move the head 12$_{-i}$ to the track $T_{jk}$. The CPU 21 also executes positioning control to position the head 12$_{-i}$ moved to the track $T_{jk}$, at a predetermined position on the track $T_{jk}$. FIG. 10A shows that the head 12$_{-i}$ is positioned at the predetermined position on the track $T_{jk}$. In the state shown in FIG. 10A, the CPU 21 causes the head 12$_{-i}$ to write one track (for example, 512 sectors) of first test data to the disk 11 (step S14). Then, the CPU 21 causes the head 12$_{-i}$ to read data from the track $T_{jk}$ and measures an error rate $ER_1$ indicative of the rate of a read error (step S15). The measured error rate $ER_1$ is stored in a first area in the RAM 23.

Then, the CPU 21 executes control to shift the position of the head 12$_{-i}$ from the track $T_{jk}$ (the predetermined position on the track $T_{jk}$) in a radially outward direction of the disk 11 by the amount $STP+(h-1)*\Delta O$ (step S16). FIG. 11B shows that the position of the head 12$_{-i}$ has been shifted from the track $T_{jk}$ in the radially outward direction of the disk 11 by the amount $STP+(h-1)*\Delta O$. For h=1, the value of the offset of the head 12$_{-i}$ from the track $T_{jk}$ equals the STP (Servo Track Pitch). In the state shown in FIG. 11B, the CPU 21 causes the head 12$_{-i}$ to write one track of second test data to the disk 11 (step S17). Then, the CPU 21 executes control to shift the position of the head 12$_{-i}$ from the track $T_{jk}$ (the predetermined position on the track $T_{jk}$) in a radially inward direction of the disk 11 by the amount $STP+(h-1)*\Delta O$ (step S18). FIG. 11C shows that the position of the head 12$_{-i}$ has been shifted from the track $T_{jk}$ in the radially inward direction of the disk 11 by the amount $STP+(h-1)*\Delta O$. This position of the head 12$_{-i}$ is offset from the position shown in FIG. 11B by the amount $2\{STP+(h-1)*\Delta O\}$.

In the state shown in FIG. 1C, the CPU 21 causes the head 12$_{-i}$ to write one track of second test data to the disk (step S19). Then, the CPU 21 executes control to return the head 12$_{-i}$ to the position of the track $T_{jk}$ (step S20). The CPU 21 causes the head 12$_{-i}$ to read data from the track $T_{jk}$ and measures an error rate $ER_2$ indicative of the rate of a read error (step S21). The measured error rate $ER_2$ is stored in a second area in the RAM 23. Then, on the basis of the error rates $ER_1$ and $ER_2$ stored in the first and second areas, respectively, in the RAM 23, the CPU 21 makes determinations described below. The CPU determines whether or not the value $ER_2 - ER_1$ is smaller than a threshold TH (step S22).

Here, it is assumed that $ER_2 - ER_1 \leq TH$. In this case, the CPU 21 determines that the writes of the second test data in steps S17 and S19 adversely affects the first test data written in the track $T_{jk}$. That is, the CPU 21 determines that the adverse effects of crosstalk cannot be eliminated even by writing data while shifting the head 12$_{-i}$ from the track $T_{jk}$ in the radially outward or inward direction of the disk 11 by the amount $STP+(h-1)*\Delta O$. Then, the CPU 21 executes step S23, described later, in order to suppress the adverse effects of crosstalk. Specifically, the CPU 21 increments a variable h by 1 in order to increase the value of the offset of the head 12$_{-i}$ from the track $T_{jk}$ (step S23). Then, the CPU 21 uses the incremented variable h to execute steps S14 to S22, described later. That is, the CPU 21 repeats steps S14 to S22 while incrementing the variable h by 1 until $ER_2 - ER_1 < TH$ (step S23).

It is assumed that $ER_2 - ER_1 < TH$. In this case, the CPU 21 determines that the current value of the offset of the head 12$_{-i}$ from the track $T_{jk}$ is the minimum offset value required to eliminate the adverse effects of crosstalk. Then, the CPU 21 determines whether or not the pointer j is 1 (initial value) (step S24). If the pointer j is 1, the CPU 21 determines the offset values $\Delta O_j$ and $O_j$ unique to the area $A_j$ in accordance with the following equation (step S25):

$$\Delta O_j = 2(h-1)*\Delta O \quad O_j = \Delta O_j/2 \tag{4}$$

On the other hand, if the pointer j is not 1, the CPU 21 determines the offset values $\Delta O_j$ and $O_j$ unique to the area $A_j$ in accordance with the following equation (step S26):

$$\Delta O_j = 2(h-1)*\Delta O \quad O_j = O_{j-1} + \Delta O_{j-1}(N_{j-1} - \tfrac{1}{2}) + \Delta O_j/2 \tag{5}$$

Then, the CPU 21 stores information indicative of the leading track $T_{j0}$ in the area $A_j$ and information indicative of the offset values $O_j$ and $\Delta O_j$ determined, in the entry $E_j$ in the offset table 222, retained in the FROM 22 (step S27). Then, the CPU 21 determines whether or not the pointer j is n, indicating the final area $A_n$ (step S24). If the pointer j is not n, the CPU 21 increments the pointer j by one and sets the variable h at 1 (initial value) (step S29). Then, the CPU 21 executes the process starting with step S12 in order to determine the values $\Delta O_j$ and $O_j$ unique to the area $A_j$ indicated by the incremented pointer j. That is, the CPU 21 repeats the process starting with step S12 until the pointer j becomes n and the values $\Delta O_j$ and $O_j$ unique to the area $A_n$ are determined. Then, if it is determined at step S28 that the pointer j is n, the CPU 21 ends the process of determining the offsets $O_j$ and $\Delta O_j$.

In the above described process of determining the $O_j$ and $\Delta O_j$, for simplification of description, the process from steps S13 to S21 is executed only once for a certain h. However, for measurement accuracy, the process from steps S13 to S21 may be repeated a predetermined number of times r. In this case, it may be determined whether or not the value $(\{\Sigma(ER_2)-\Sigma(ER_1)\}/r)$ is smaller than the threshold TH. The value $(\{\Sigma(ER_2)-(ER_1)\}/r)$ is obtained by subtracting the average of error rates $ER_1$ $(\Sigma(ER_1)/r)$ from the average of error rates $ER_2$ $(\Sigma(ER_2)/r)$.

In the above embodiment, the heads $12_{-0}$ and $12_{-1}$ are each of a composite type. However, the heads $12_{-0}$ and $12_{-1}$ may each be of an inductive type that uses a common element to execute read/write. In this case, the head width of the heads $12_{-0}$ and $12_{-1}$ has only to be taken into account. The recording surfaces $H_0$ and $H_1$ of the disk 11 may be managed as areas $A_0$ and $A_1$, respectively.

In the description of the above embodiment, the present invention is applied to the HDD (Hard Disk Drive). However, the present invention is applicable to disk drives other than HDDs, such as magneto-optical disk drives provided that their heads read and write data from and to a disk.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:
a disk having a recording surface on which a plurality of concentric tracks are arranged at a fixed pitch;
a head arranged in association with the recording surface of the disk and used to read and write data from and to the disk;
means for calculating a first offset value on the basis of the position of a first target track specified by a command from a host, the first offset value reflecting a track pitch which enables adverse effects of crosstalk to be suppressed, the first offset value indicating an offset of a target position at which the head is to be actually positioned from a predetermined position on the first target track in a radial direction of the disk;
means for determining a second target track, to which the target position belongs, and a second offset value on the basis of the position of the first target track and the first offset value calculated by the calculating means, the second offset value indicating an offset of the target position from a predetermined position on the second target track in the radial direction of the disk; and
means for executing control to position the head at the target position on the second target track on the basis of the second target track position and second offset value each determined by the determining means.

2. The disk drive according to claim 1, wherein:
the head is a composite head;
the recording surface of the disk is divided into a plurality of concentric areas in accordance with an azimuth angle of the head; and
the calculating means calculates the first offset values in accordance with one of the plurality of areas on the recording surface of the disk and the relative position of the first target track in the one area, the first target track belonging to the one area.

3. The disk drive according to claim 2, further comprising means for identifying the one area; and wherein the calculating means calculates the first offset value in accordance with the area identified by the identifying means and the relative position of the first target track in the identified area.

4. The disk drive according to claim 3, further comprising:
a nonvolatile memory which pre-stores a third and fourth offset values unique to each of the areas on the recording surface of the disk, the third offset value indicating a pitch difference between a first track pitch representative of the pitch of the tracks on the recording surface and a second track pitch the enables the adverse effects of crosstalk to be suppressed, the fourth offset value indicating, if a predetermined track at a predetermined relative position within the corresponding area is the first target track, an offset of the target position at which the head is to be actually positioned from the predetermined position on the first target track in the radial direction of the disk; and
means for reading the third and fourth offset values corresponding to the area identified by the identifying means, from the nonvolatile memory; and
wherein the calculating means calculates the first offset value on the basis of the third and fourth offset values read by the reading means, the first track pitch, and an offset of the first target track, the offset of the first target track being offset from the relative position of the predetermined track in the area to which the first target track belongs.

5. The disk drive according to claim 3, further comprising:
a nonvolatile memory which pre-stores a third offset value unique to each of the areas on the recording surface of the disk, the third offset value indicating a pitch difference between a first track pitch representative of the pitch of the tracks on the recording surface and a second track pitch the enables the adverse effects of crosstalk to be suppressed; and
means for reading, from the nonvolatile memory, the third offset value corresponding to each of areas, the areas ranging from an area to which a leading track on the recording surface of the disk belongs, to the area identified by the identifying means; and
wherein the calculating means calculates the first offset value on the basis of the third offset value read by the reading means, the first track pitch, and an offset of the first target track, the offset of the first target track being offset from the relative position of the predetermined track in the area to which the first target track belongs.

6. The disk drive according to claim 1, further comprising another head paired with the head; and wherein:
the disk has another recording surface constituting a surface opposite to the recording surface relative to the disk and corresponding to the another head; and
the calculating means calculates the first offset value on the basis of the recording surface of the disk, to which the first target track belongs, and the relative position of the first target track on the recording surface.

7. The disk drive according to claim 6, further comprising means for identifying the recording surface of the disk to which the first target track belongs; and wherein the calculating means calculates the first offset value in accordance with the recording surface identified by the identifying means and the relative position of the first target track on the recording surface.

8. The disk drive according to claim 7, further comprising:
a nonvolatile memory which pre-stores a third and fourth offset values unique to the recording surface of the disk, the third offset value indicating a pitch difference between a first track pitch representative of the pitch of the tracks on the recording surface and a second track pitch the enables the adverse effects of crosstalk to be suppressed, the fourth offset value indicating, if a predetermined track at a predetermined relative position on the recording surface is the first target track, an offset of the target position at which the head is to be actually positioned from the predetermined position on the first target track in the radial direction of the disk; and
means for reading the third and fourth offset values corresponding to the area identified by the identifying means, from the nonvolatile memory; and
wherein the calculating means calculates the first offset value on the basis of the third and fourth offset values read by the reading means, the first track pitch, and an offset of the first target track from the relative position of the predetermined track on the recording surface to which the first target track belongs.

9. The disk drive according to claim 7, further comprising:
a nonvolatile memory which pre-stores a third offset value unique to each of the recording surfaces of the disk, the third offset value indicating a pitch difference between a first track pitch representative of the pitch of the tracks on each of the recording surfaces and a second track pitch the enables the adverse effects of crosstalk to be suppressed; and
means for reading, from the nonvolatile memory, the third offset value corresponding to each of the recording surfaces of the disk from a leading recording surface to the recording surface identified by the identifying means; and
wherein the calculating means calculates the first offset value on the basis of the third offset value corresponding to each of the recording surfaces of the disk from a leading recording surface to the recording surface identified by the identifying means, the first track pitch, and an offset of the first target track from the relative position of the predetermined track on the recording surface to which the first target track belongs.

10. A disk drive comprising:
a disk having a recording surface on which a plurality of concentric tracks are arranged at a fixed pitch;
a head arranged in association with the recording surface of the disk and used to read and write data from and to the disk;
means for calculating a first offset value on the basis of a pitch difference corresponding to the head width of the head and the position of a first target track specified by a command from a host, the pitch difference being a difference between a first track pitch representative of the pitch of the tracks and a second track pitch which enables adverse effects of crosstalk to be suppressed, the first offset value indicating an offset of a target position at which the head is to be actually positioned from a predetermined track on the first target track in a radial direction of the disk;
means for determining a second target track, to which the target position belongs, and a second offset value on the basis of the position of the first target track and the first offset value calculated by the calculating means, the second offset value indicating an offset of the target position from a predetermined position on the second target track in the radial direction of the disk; and
means for executing control to position the head at the target position on the second target track on the basis of the second target track position and second offset value each determined by the determining means.

11. The disk drive according to claim 10, further comprising a nonvolatile memory which pre-stores a third offset value indicating the pitch difference corresponding to the head width of the head and wherein the calculating means calculates the first offset value on the basis of the third offset value stored in the nonvolatile memory and the position of the first target track.

12. A disk drive comprising:
a disk having a recording surface on which a plurality of concentric servo tracks are arranged at a first track pitch, servo information including positional information being written discretely at equal intervals in a circumferential direction of the disk for each of the servo tracks;
a head arranged in association with the recording surface of the disk and used to read and write data from and to the disk; and
means for controlling a data write to the disk executed by the head, the controlling means controlling the data write so that the track pitch of data tracks formed on the recording surface of the disk as a result of data writes is a second track pitch which enables the adverse effects of crosstalk to be suppressed.

13. The disk drive according to claim 12, wherein:
the head is a composite head;
the recording surface of the disk is divided into a plurality of concentric areas in accordance with an azimuth angle of the head; and
the second track pitch is set for each of the areas on the recording surface of the disk to have a value reflecting a data write width of the head associated with the azimuth angle of the head, the second track pitch being equal to or larger than the first track pitch.

14. A method of positioning a head at a target position on a disk in a disk drive, the disk having a recording surface on which a plurality of concentric tracks are arranged at a fixed pitch, the head being used to read and write data from and to the disk, the method comprising:
calculating a first offset value on the basis of the position of a first target track specified by a command from a host, the first offset value reflecting a track pitch which enables adverse effects of crosstalk to be suppressed, the first offset value indicating an offset of a target position at which the head is to be actually positioned from a predetermined position on the first target track in a radial direction of the disk;
determining a second target track, to which the target position belongs, and a second offset value on the basis of the position of the first target track and the calculated first offset, the second offset value indicating an offset of the target position from a predetermined position on the second target track in the radial direction of the disk; and positioning the head at the target position on the determined second target track on the basis of the determined second target track position and second offset value.

15. The method according to claim 14, wherein:
the head is a composite head;
the recording surface of the disk is divided into a plurality of concentric areas in accordance with an azimuth angle of the head; and
the first offset values is calculated in accordance with one of the plurality of areas on the recording surface of the disk and the relative position of the first target track in the area, the first target track belonging to the one of the plurality of areas.

16. The method according to claim 15, further comprising reading third and fourth offset values corresponding to an area on the recording surface of the disk to which the first target track belongs, from a nonvolatile memory which pre-stores the third and fourth offset values unique to each of the areas on the recording surface of the disk, the third offset value indicating a pitch difference between a first track pitch representative of the pitch of the tracks on the recording surface and a second track pitch the enables the adverse effects of crosstalk to be suppressed, the fourth offset value indicating, if a predetermined track at a predetermined relative position within the corresponding area is the first target track, an offset of the target position at which the head is to be actually positioned from the predetermined position on the first target track in the radial direction of the disk; and
wherein the first offset value is calculated on the basis of the third and fourth offset values read from the nonvolatile memory, the first track pitch, and an offset of the first target track, the offset of the first target track being offset from the relative position of the predetermined track in the area to which the first target track belongs.

17. The method according to claim 16, further comprising:
measuring the third and fourth offset values for each of the areas during a manufacturing stage for the disk drive; and
storing the measured third and fourth offset values for each of the areas in the nonvolatile memory.

18. The method according to claim 17, wherein the measuring includes:
selecting a track from each of the areas;
allowing the head to write data at a position offset from the selected track in the radial direction of the disk by an amount "the first track pitch+(h−1)*ΔO" (where h denotes a variable with an initial value of 1 and ΔO denotes a predetermined fifth offset value);
determining whether a data write executed by the head causes the selected track to be adversely affected by crosstalk;
repeatedly writing the data while incrementing the variable h by one until it is determined that the data write executed by the head will not cause the selected track to be adversely affected by crosstalk;
when it is determined that the data write executed by the head will not cause the selected track to be adversely affected by crosstalk, determining twice the value "(h−1)*ΔO" to be the third offset value unique to the corresponding area; and
determining the fourth offset value unique to the corresponding area, on the basis of the determined third offset value.

19. The method according to claim 15, further comprising reading a third offset value corresponding to each of areas from an area to which a leading track on the recording surface of the disk belongs to the area to which the first target track belongs, from a nonvolatile memory which pre-stores a third offset value unique to each of the areas on the recording surface of the disk, the third offset value indicating a pitch difference between a first track pitch representative of the pitch of the tracks on the recording surface and a second track pitch the enables the adverse effects of crosstalk to be suppressed; and
wherein the first offset value is calculated on the basis of the third offset value read from the nonvolatile memory, the first track pitch, and an offset of the first target track, the offset being offset from the relative position of the predetermined track in the area to which the first target track belongs.

20. The method according to claim 19, further comprising:
measuring the third offset value for each of the areas during a manufacturing stage for the disk drive; and
storing the measured third offset value for each of the areas in the nonvolatile memory.

21. The method according to claim 20, wherein the measuring includes:
selecting a track from each of the areas;
allowing the head to write data at a position offset from the selected track in the radial direction of the disk by an amount "the first track pitch+(h−1)*ΔO" (where h denotes a variable with an initial value of 1 and ΔO denotes a predetermined fifth offset value);
determining whether a data write executed by the head causes the selected track to be adversely affected by crosstalk;
repeatedly writing the data while incrementing the variable h by one until it is determined that the data write executed by the head will not cause the selected track to be adversely affected by crosstalk; and
determining twice the value "(h−1)*ΔO" to be the third offset value unique to the corresponding area, when it is determined that the data write executed by the head will not cause the selected track to be adversely affected by crosstalk.

* * * * *